No. 690,317. Patented Dec. 31, 1901.
H. RENOLD.
DRIVING CHAIN.
(Application filed Mar. 23, 1901.)
(No Model.)
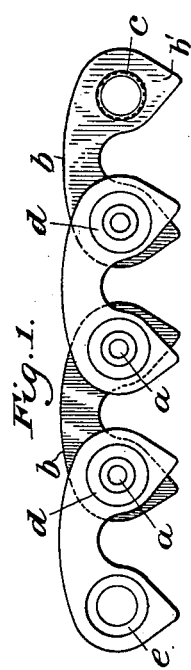
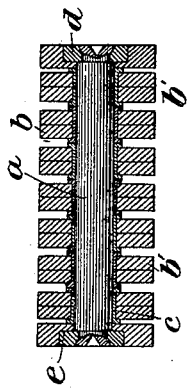
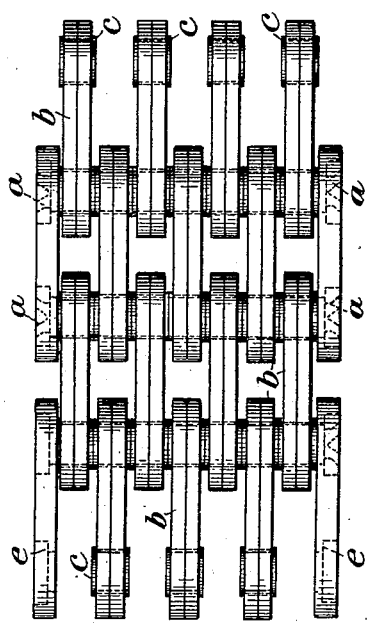
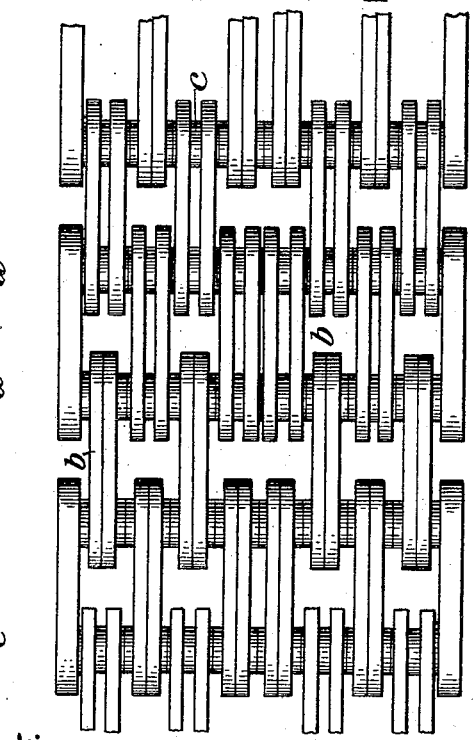
WITNESSES
INVENTOR
Hans Renold
by Bakewell & Bakewell
his atty's.

UNITED STATES PATENT OFFICE.

HANS RENOLD, OF MANCHESTER, ENGLAND, ASSIGNOR TO THE EWART MANUFACTURING COMPANY, OF CHICAGO, ILLINOIS, A CORPORATION OF ILLINOIS.

DRIVING-CHAIN.

SPECIFICATION forming part of Letters Patent No. 690,317, dated December 31, 1901.

Application filed March 23, 1901. Serial No. 52,473. (No model.)

*To all whom it may concern:*

Be it known that I, HANS RENOLD, of Manchester, in the county of Lancaster, England, have invented a new and useful Driving-Chain, of which the following is a full, clear, and exact description.

The object of my invention is to so form and arrange the link of chains that both the chain and chain-wheels are rendered more durable and the chain itself more pliable, and thus capable of running at a greater speed than hitherto has been the case.

In order that my invention may be more fully understood, I have shown it in the accompanying drawings.

Figure 1 is a side view, Fig. 2 a plan view, and Fig. 3 a cross-section, of one form of driving-chain constructed in accordance with my invention. Figs 4 and 5 are plans of two other forms.

My chain is made up of links arranged in groups of two or more, the groups being set side by side and connected by a pivot-pin. The members of the respective groups are not separate from each other; but the members of each group are held together by a hard bush, which is pressed in the pin-holes of said members and holds them together. The bushes preferably project somewhat beyond the surfaces of the outer members of the group, and the projecting portions terminate short of the ends of the said members, so as to afford intermediate spaces between the adjacent groups, thus increasing the width and wearing-surface of the chain, affording intermediate oiling-spaces and reducing the friction of the links upon each other. The chain is thus rendered more pliable and capable of running at a higher speed than heretofore.

In the drawings, Figs. 1 and 2, *b b* are the groups above mentioned, each composed of two or more members held together by bushes *c c*, arranged as above stated and projecting somewhat beyond the outer surfaces of the members. The groups are connected by a pivot-pin *a*.

In lieu of employing washers *d*, which are riveted to the ends of the joint-pin *a*, upon the outside of the links, I form the latter comparatively thicker and with a recess *e*, adapted to receive the said washer, (see more particularly Fig. 3,) which brings the said washer flush, and thus level with the outside of the link and considerably reduces the wear of the flanges of the chain-wheel hitherto experienced and prevents the chain catching. The said link-pins I prefer to harden and polish very highly, and the said washers are riveted thereto by forming each pin end with a neck, which I countersink or form with a hole, while the diameter of the said neck I make slightly larger than the diameter of the hole in the washer *d*, and its edge I slightly round off, so as to facilitate being driven very tightly into the said washer and when riveted become rigid therewith. In order to bring the pin ends perfectly level with the washer, I slightly countersink the hole on the outside thereof, which also tends to reduce the wear on the flanges of the chain-wheel and insure silent running.

According to another form of my invention (see Fig. 4) I make the bushes *c* comparatively longer and secure thereon the said links a suitable distance apart from each other, whereby the bearing of the joint-pin is increased without a corresponding increase of weight and the total weight of the chain thus reduced.

According to another form of my invention I may arrange the inner chain-links as shown in Fig. 5—*i. e.*, in each row of links I may space every alternate pair of links upon the said bushes *c*, so that the teeth *b'* of the said links will bear against different parts of the teeth of the chain-wheel, and by an uneven number of the latter wear the chain-wheel teeth evenly across the whole width.

My improved chain is durable and efficient and has the merit of operating silently and with very little friction. Its form may be modified in various ways, since

What I claim is—

1. A chain composed of links arranged in groups set side by side, the members of the respective groups being connected by a bush passing through the pin-holes of the said members and holding them together, and a pivot-pin extending through the bushes of the respective groups; substantially as described.

2. A chain composed of links arranged in groups set side by side, the members of the respective groups being connected by a bush passing through the pin-holes of the said members and holding them together, said bushing projecting beyond the surfaces of the outer members of the group, terminating laterally short of the ends of the members, and affording an intermediate space between the adjacent groups; substantially as described.

In testimony whereof I have hereunto set my hand.

HANS RENOLD.

Witnesses:
A. E. PATERSON,
VERNON WOOD.